US012522525B1

(12) United States Patent
King et al.

(10) Patent No.: US 12,522,525 B1
(45) Date of Patent: Jan. 13, 2026

(54) CHEMICAL MAINTENANCE SYSTEMS

(71) Applicant: King Technology, Inc., Minnetonka, MN (US)

(72) Inventors: Joseph A King, Wayzata, MN (US); David Guy, Maple Grove, MN (US); Randy Roseth, Chanhassen, MN (US); Michael Ray, Atlanta, GA (US); Mary McCarty, Montrose, MN (US); Jeffrey Johnson, Edina, MN (US); Eric Barton, Eden Prairie, MN (US)

(73) Assignee: King Technology, Inc., Minnetonka, MN (US)

( * ) Notice: Subject to any disclaimer, the term of this patent is extended or adjusted under 35 U.S.C. 154(b) by 0 days.

(21) Appl. No.: 18/482,859

(22) Filed: Oct. 7, 2023

Related U.S. Application Data

(63) Continuation of application No. 16/501,329, filed on Mar. 25, 2019, now abandoned.

(60) Provisional application No. 62/917,726, filed on Dec. 24, 2018.

(51) Int. Cl.
*C02F 1/50* (2023.01)
*C02F 103/42* (2006.01)

(52) U.S. Cl.
CPC ............ *C02F 1/50* (2013.01); *C02F 2103/42* (2013.01); *C02F 2201/008* (2013.01); *C02F 2209/008* (2013.01); *C02F 2209/02* (2013.01); *C02F 2209/29* (2013.01)

(58) Field of Classification Search
None
See application file for complete search history.

(56) References Cited

U.S. PATENT DOCUMENTS

| | | | |
|---|---|---|---|
| 4,882,285 A | 11/1989 | Ogleby et al. | |
| 5,218,983 A | 6/1993 | King | |
| 5,976,385 A | 11/1999 | King | |
| 6,190,547 B1 | 2/2001 | King et al. | |
| 6,447,722 B1 * | 9/2002 | Rakestraw | B01F 21/22 252/186.25 |
| 6,500,334 B1 | 12/2002 | King et al. | |
| 6,652,871 B1 | 11/2003 | King et al. | |
| 7,060,190 B2 | 6/2006 | King et al. | |
| 7,347,934 B2 | 3/2008 | King et al. | |
| 7,501,067 B2 | 3/2009 | King et al. | |
| 7,641,791 B2 | 1/2010 | King et al. | |
| 7,875,191 B2 | 1/2011 | King et al. | |
| 8,070,941 B2 | 12/2011 | King et al. | |

(Continued)

OTHER PUBLICATIONS

PHin Wi-Fi-Enabled Smart Water, amazon.com website, 3 pages.

(Continued)

*Primary Examiner* — Richard C Gurtowski
(74) *Attorney, Agent, or Firm* — Fredrikson & Byron, P.A.

(57) ABSTRACT

A method of maintaining a body of water in a usable condition where a sensor located in the body of water transmits information on water conditions to a server with the server including a database with the server generating a first maintenance recommendation if it is determined that the body of water contains a synergistic chemical combination and a different recommendation if it is determined that the body of water does not contain a synergistic chemical combination even though the transmitted information on the water conditions are the same.

13 Claims, 3 Drawing Sheets

(56) References Cited

U.S. PATENT DOCUMENTS

| | | | |
|---|---|---|---|
| 8,591,748 | B2 | 11/2013 | Hill et al. |
| 8,999,259 | B2 | 4/2015 | King et al. |
| 9,039,988 | B2 | 5/2015 | King et al. |
| 9,187,351 | B2 | 11/2015 | King et al. |
| 9,314,747 | B2 | 4/2016 | King et al. |
| 9,834,451 | B2 | 12/2017 | Miller et al. |
| 9,873,625 | B2 | 1/2018 | King et al. |
| 9,975,791 | B2 | 5/2018 | King |
| 2010/0230365 | A1* | 9/2010 | Hill .................. C02F 1/505 210/744 |
| 2014/0369886 | A1 | 12/2014 | King et al. |
| 2017/0267547 | A1 | 9/2017 | Miller et al. |
| 2018/0118581 | A1 | 5/2018 | Miller et al. |

OTHER PUBLICATIONS

PHin Smart Pool Monitor, John R. Delaney, PCMag, Sep. 6, 2017, 8 pages.

PHin: A Review by Pool Pro, Jan. 1, 2018, 5 pages.

Swim University, 21 Useful Smartphone Apps for Pools and Hot Tubs, presented by pHin, last updated Dec. 7, 2018, 34 pages.

ORP vs pH Chart, Google Search, Jan. 14, 2019, 1 page.

FCE: Groundbreaking Measurement of Free Chlorine Disinfecting Power in a Handheld Instrument, Myron L Company White Paper, Jan. 2012, 12 pages.

ORP Control in Pools and Spas, J Steininger D. Sc. Copyright SBCS 1998, 4 pages.

Hach, Silver Reagent Set, Colorimetric Method, Specifications, 1 page.

Test Strips 1 Ea Testing Parameter: Silver Range: 50, 100, 250, 500, 1000 ppb, grainger.com website, Jan. 15, 2019, 2 pages.

PHin website, https://www. pHin.co/, Supported Chemicals, 11 pages.

Taylor Technologies, Inc. Pool & Spa Water Chemistry: A Testing & Treatment Guide, Revised May 2015, 34 pages.

* cited by examiner

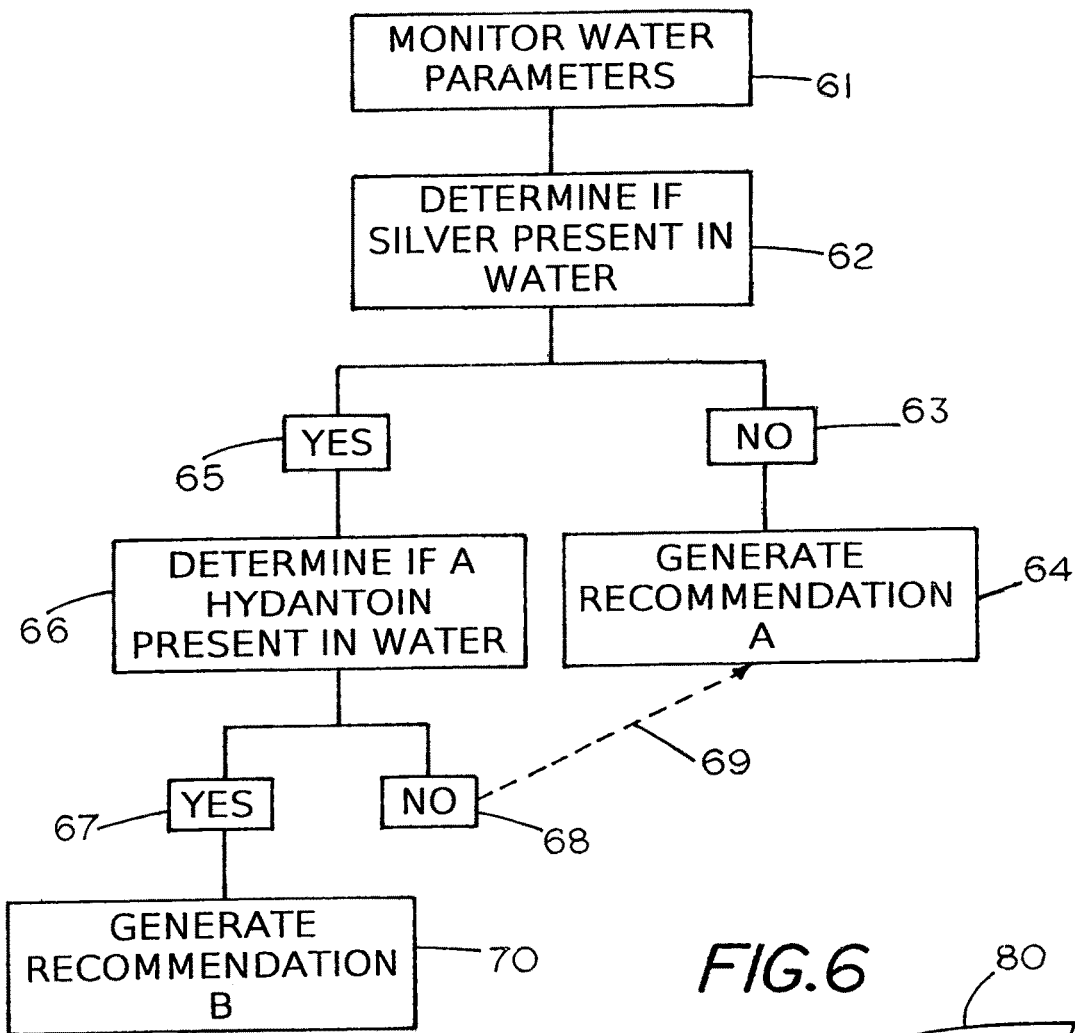
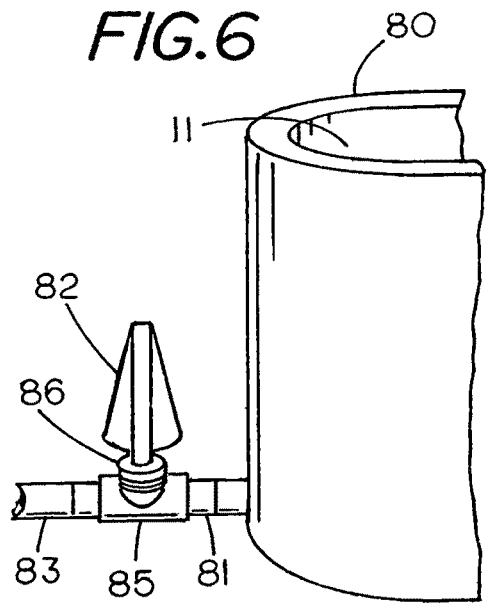

CHEMICAL MAINTENANCE SYSTEMS

CROSS-REFERENCE TO RELATED APPLICATION

This application is a continuation of U.S. patent application Ser. No. 16/501,329, filed Mar. 25, 2019, which claims priority to U.S. Provisional Patent Application No. 62/917,726, filed Dec. 24, 2018, the entire contents of which are incorporated by reference.

FIELD OF THE INVENTION

This invention relates generally to water testing of hot tubs to determine if additional chemicals as well as the amount of chemicals should be added to a hot tub to maintain the water in the hot tub in a safe user-friendly condition.

BACKGROUND OF THE INVENTION

Maintaining hot tubs requires one to periodically monitor and measure various water parameters and then compare the results to industry standards to determine if the water is suitable for hot tub use. If the water is not suitable for use one needs to add various chemicals to make the water suitable for use. Typically, those who maintain the hot tubs lack the necessary chemical background to fully understand why and when to adjust the various water parameters as well as the needed level of sanitizer in order to keep the water in a safe usable condition. As a result those who maintain the hot tubs rely on others including industry organizations to provide guidelines on what and when to add chemicals such as chlorine or bromine to make the water safe for use in the hot tub. For example, one such group that provides guidelines is the American Chemistry Council, which advises owners that in a system using chlorine as a sanitizer the "free available chlorine [FAC] in the system should be in the range of 2-4 ppm, but never fall below 1.0 ppm". Other companies such as Taylor Technologies, Inc. of Sparks, Maryland 21152 sell test kits that includes a guide that contains recommendations on an acceptable level of 14 different water parameters, which are based on recommendations by the American Swimming Coaches Association.

For example, the Taylor Technologies guide references the National swimming Foundation CPO handbook as it recommends that when chlorine is uses as the sanitizer in a residential hot tub, the level of free chlorine should be between 2 ppm and 10 ppm with the ideal range of free chlorine between 3 ppm and 5 ppm. Similarly, if bromine is used as a sanitizer in a residential hot tub, the guide recommends the level of total bromine should be between 2 ppm and 10 ppm with the ideal range of bromine between 4 ppm and 6 ppm.

Today's hot tub operators may also "Google" to determine how much chlorine or bromine should be maintained in the hot tub when chlorine or bromine is used as a sanitizer. While such sources obtained through Google may or may not be based on actual testing the owner usually finds that for systems using chlorine as a sanitizer the free chlorine level should be maintained at least 1 ppm and ideally at 2 to 4 ppm in a hot tub.

Unfortunately the information available to the public from various organizations as well as the Internet is often based on "a one size fits all" and ignores the effect that synergist chemical combinations may have on the suitability of the hot tub water as well as the level of sanitizer to maintain the hot tub in a safe user friendly condition. Surprisingly, even those who offer systems for monitoring hot tub water and generate information on when to add sanitizers may not recognize that the "one size fits all" approach is not a proper method for hot tub systems that contain synergistic chemical combinations. Consequently, recommendations based on "one size fits all" can lead to water conditions where the free chlorine may be at an unnecessarily high level, an undesirable effect in hot tubs since high water temperature in hot tubs or spas opens skin pores, which may increase the chances of adverse chlorine effects such as nausea, itchy eyes, skin redness as well as other effects.

Typically, prior art systems such as shown in U.S. Pat. No. 9,834,451 measure a parameter or parameters associated with a liquid found in a hot tub, however, they fail to consider certain synergistic chemical combinations, which can lead to incorrect recommendations to the operator who needs to maintain his or her hot tub in a safe user friendly condition.

BRIEF DESCRIPTION OF THE INVENTION

The invention described herein is a hot tub water maintenance system and method that determines if a synergistic chemical combination of metal ions such as silver or silver ions and a hydantoin are present in the water in a hot tub in order to generate maintenance recommendations for maintaining the water in the hot tub in a safe useable condition.

If it is determined that a synergistic chemical combination is present in the body of water one needs to provide maintenance recommendations based on a synergistic chemical combination. However, whether there is or there is not a synergistic chemical combination in the hot tub one takes water measurements, transmits the information to a local transceiver/server, typically through blue tooth technologies, which then through Wi-Fi technologies transmits the information to a processor at a remote location that compares measurements to a data base that incudes synergistic chemical combinations as well as non synergistic chemical combinations to determine the chemicals needed to maintain the system in the form of a synergistic sensitive recommendation.

If it is determined that a synergistic chemical combination is not present in the body of water one takes water measurements, transmits the information to a local server or smart phone, typically through blue tooth technologies, which then through Wi-Fi technologies may transmit the information to a processor at a remote location that compares measurements to a data base to determine the chemicals needed based on whether there is or there is not a synergistic chemical combination in the body of water.

If desired the processor may initiate action to ship the needed chemicals, for example in colored pods or pouches to the hot tub owner, as well as recommendations on when to add the pods or pouches to the hot tub.

The invention described herein is improvement to existing hot tub and pool maintenance systems and includes the identification of synergistic chemical combinations within the body of water that have an affect on the free chlorine levels in the hot tub water. The method uses the presence or absence of synergistic chemical combinations in the hot tub water before generating consumer maintenance information on the amount of additional chemicals to add to the water in the hot tub in order to maintain the free chlorine level in the hot tub or pool at a safe level.

BRIEF DESCRIPTION OF THE DRAWINGS

FIG. 5 is a flow chart of a system for generating recommendations to add additional chemicals to the water in a hot tub or a pool where the generated recommendations are based on determination of the existence of non-synergistic chemical combinations or synergistic chemical combinations in the hot tub or pool water; and FIG. 6 shows a hot tub or pool maintenance system with an inline water monitor with sensors therein, a transceiver in the monitor that transmits information to a further transceiver that can transmit information to or from a remote processor or to a smart phone.

DESCRIPTION OF THE PREFERRED EMBODIMENT

Figure 1:
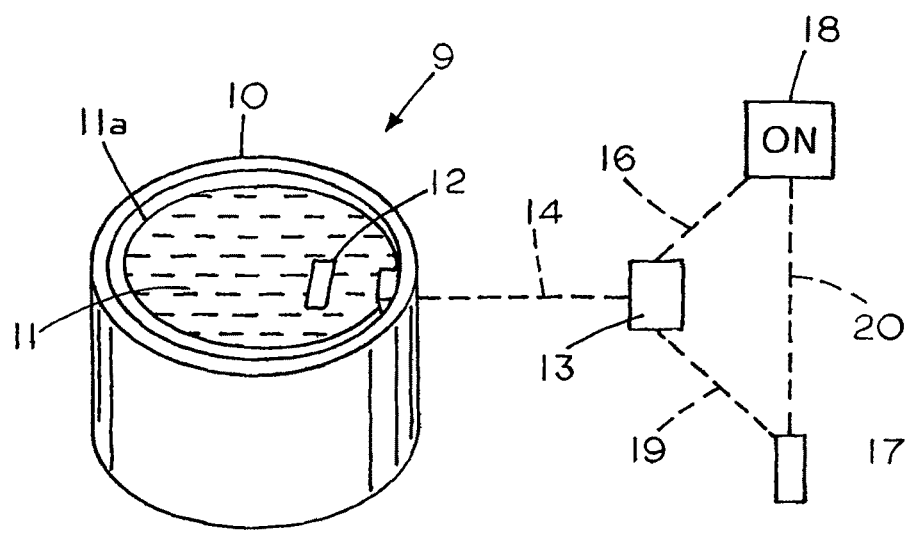
FIG. 1 shows a hot tub or pool maintenance system with an in water monitor with sensors therein, a transceiver in the monitor that transmits information to a further transceiver that can transmit information to or from a remote processor or to a smart phone.

FIG. 1 shows a system 9 for maintaining a recreational body of water in a safe condition. The system 9 includes a hot tub 10 with a body of recreational water 11 and a monitor 12 located in the body of water with monitor 12 including one or multiple sensors for measuring water conditions in the hot tub, for example, a temperature sensor, an ORP (oxidation reduction potential) sensor as well as other sensors. The sensors may monitor water parameters continuously or may monitor intermittingly to obtain water information. In one example, Monitor 12 may be secured to the tub 10 or may be allowed to float freely in the hot tub. Monitor 12 also includes a transceiver and battery therein for transmitting information on sensor measured water conditions to a local server 13, typically through Bluetooth technologies as indicated by dashed line 14. In this example the local server 13 is in wireless communication 16 with a remote processor 18 (dashed line 16) and with a smartphone 17 (dashed line 19) through a further wireless communication such as Wi-Fi technologies. The smartphone 17 also being in wireless communication with the processor 18 (dashed line 17a). In other cases the monitor 12 may be connected directly to the server to transfer water information thereto.

In operation of the system information obtained from the sensors located in the monitor 12 can be communicated to the central processing unit or processor 18 that contains a data base that can be accessed to generate recommendations on what chemicals to add to the hot tub based on measurements obtained by the sensors in the monitor 12 as well as information on other water conditions that may not be measured by the sensors in monitor 12. In this example the information obtained from water sensor measurements may be fed to the central processing unit 18, which generates recommendation based on measurements and the database within the central processing unit 18. Typically, the sensors in monitor 12 can provide measurements of conventional water conditions such as temperature, pH, hardness, or oxidation-reduction potential of the water.

As described herein the invention comprises a method for maintaining a body of water 11 such as a hot tub in a condition for human immersion by placing a buoyant monitor 12 with a sensor 12a, a sensor 12b and a transceiver 12c in the water in a hot tub. The monitor 12 may contain a single or multiple sensors that can measure at least one parameter or condition of the hot tub water 11. In this example the buoyant monitor 12 incudes sensors where the at least one parameter or condition of the hot tub water 11 is selected for measurement is from a group consisting of temperature of the water, pH of the water, and oxidation reduction potential of the water. Once the water condition is measured the transceiver 12c in monitor 12 transmits the water condition information from the buoyant monitor 12 to a server 13, which is located proximate the hot tub 10, preferably through Blue Tooth technology. Server 13, which is located proximate the hot tub connects to the Internet for communicating with the offsite central processing unit (CPU) 18.

In the method described herein one enters information in either server 13 or CPU 18 on whether the hot tub body of water 11 contains a silver metal and a hydantoin since the combination of silver and a hydantoin are a synergistic combination that has an effect on the minimum level of sanitizers to be maintained in the hot tub. The synergistic combination of silver and a hydantoin allows one to maintain a hot tub where the measured level of free chlorine is at least 50% less than the level of measured free chlorine recommended in the "one size fits all" public guidelines. In this example the CPU contains a database on water content that is configured to determine when to supply additional sanitizers to the body of water 11 based on either the presence of a hydantoin and silver i.e. a synergistic chemical combination in the hot tub body of water or the absence of a synergistic chemical combination in the body of water.

FIG. 6 shows another embodiment of a hot tub or pool maintenance system with an inline water monitor 82 with sensors therein attached to a waterline of the hot tub. In this example, a transceiver in the monitor 72 transmits information to a further transceiver that can transmit information to or from a remote processor or to a smart phone. Alternately, monitor 72 may be hard wired to the processor. In this example the water 11 enters hot tub 80 water line through a pipeline 83 and flows into sensor 82 through fittings 85 and 86. The water 11 then enters the hot tub 80 through pipeline 81.

FIG. 5 shows a flow chart on supplying additional chemicals to the water in a hot tub based on the presence or absence of a synergistic chemical combination in the water. In this example the CPU 18 uses the database therein to provide a first recommendation i.e. Recommendation A (64) if the hot tub body of water contains no silver or only silver and a different recommendation i.e. Recommendation B (70) if the hot tub body of water contains both silver and a hydantoin, i.e. a synergistic combination.

In this example the recommendations, which includes recommendations on the amount of chlorine to add to maintain the hot tub takes into consideration the presence or absence of synergistic chemical combinations in the hot tub water. For example, with a synergistic chemical combination present the recommendation on the amount of needed chlorine may be sent to smartphone 17 or server 13 and would be recommendation B to not supply additional chlorine to the water in the hot tub if the free chlorine level is at least 0.5 ppm.

Also in this example, the monitor 12 may have sufficient buoyancy so that at least one sensor on the monitor is maintained in continually contact with the body of water while in other examples the monitor may be affixed to a hot tub wall 11*a* to maintain the sensors therein in contact with the body of water.

In the method described herein the recommendations may include a variety of recommendations, for example, in addition to the recommendations on the amount of chlorine to add to the hot tub body of water or recommendations not to add chlorine to the hot tub body of water the recommendations may included but not limited to recommendations on adding pH up or pH down to the water to bring the pH of the water to neutral or recommendations on heating the water to a human comfort temperature range less than 104° F. Other recommendations may be based on other water conditions determined by the sensors in the monitor 12.

In the applicants method as described herein one determines the silver and hydantoin content of a body of recreational water before identifying an action to be taken to maintain the recreational body water since the absence of silver or a hydantoin causes the server to generate a different or non synergistic recommendation than if the recreational body of water did contain a synergistic combination of silver and a hydantoin.

The method may include determining if the body of recreational water contains a hydantoin prior to identifying one or more actions to be taken where the one or more actions to be taken comprises introducing one or more colored packages containing chlorine into the body of recreational water to maintain the minimum level of free chlorine at 0.5 ppm. Various types of packages to hold the chlorine may be used for example dissolvable packages or pods that may or may not be colored to identify the content therein.

Figure 3:
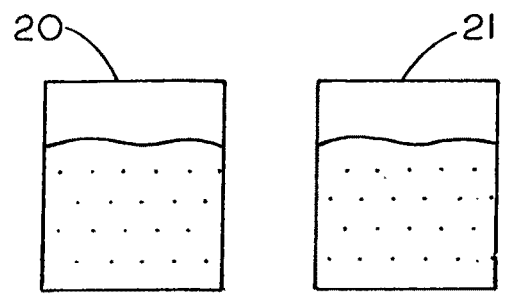
FIG. 3 shows a first additive packet or pod and a second additive packet or pod with at least one packet containing chlorine for placing in the recreational body of water.
Figure 4:
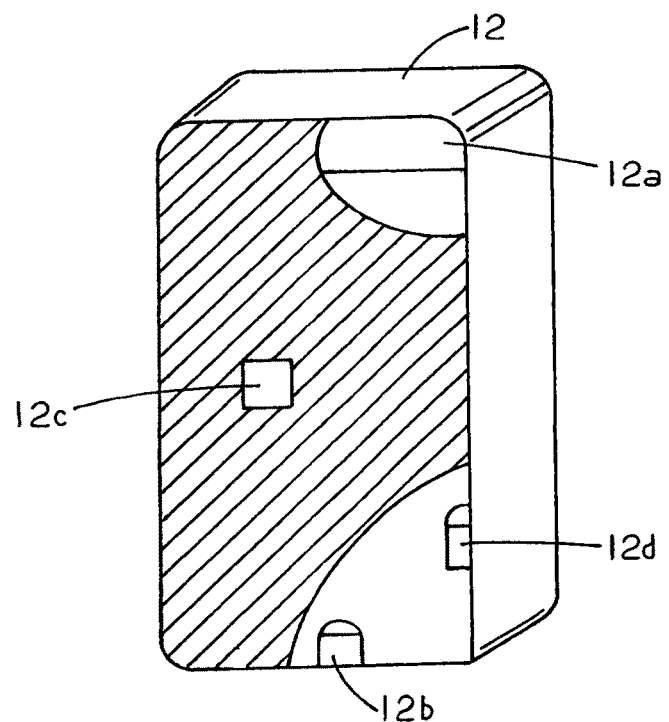
FIG. 4 shows a floating monitor containing at least one sensor and a transceiver for transmitting information obtained from the at least one sensor water to an on shore transceiver.

In this example chemical containing packets 20, 21, which are shown in FIG. 3 may be color coded and or water soluble, contain chlorine permitting them to be placed in the body of water. For example, chlorine in a soluble form may be added to the hot tub body of water if a free chlorine level in the body of water (i.e. a spa or hot tub) is less than 0.5 ppm and the body water contains a silver source and a hydantoin (i.e. synergistic combination) but not if the free chlorine level in the artificial recreational body of water is greater than 0.5 ppm. An example of a synergistic combination includes silver and hydantoins such as 1, 3-dichloro-5-5dimethyl hydantoin or 1, 3-dichloro-5-ethyl-5-methyl hydantoin. While packets such as pods are shown other types of containers including dissolvable containers may be used to hold the sanitizing chemicals that are added to the body of water. In other cases the sanitizing chemicals may be poured from a container into the body of water.

Typically, in the method described herein the spa or hot tub 10 is maintained at a temperature of at least 100° F. and a maximum of 104° F. while in contrast a pool temperature is maintained at a range about 70 to 90 degrees ° F.

An example of a system that provides spa owner with instructions on when and what to add to water in a hot tub based on the "one size fits all" is described in U.S. Pat. No. 9,834,451 as there is no recognition of the effect of synergistic combinations on free chlorine levels. While the method described therein recommends actions to hot tub owners based on measurements obtained by a floating sensor the recommendations on chemicals to add to the pools are based on "one size fits all" theory that may lead to unnecessary costs for water treatment as well as increase the risk of adverse reactions to a person using a hot tub if the hot tub contains a synergistic chemical combination since such recommendations do not consider the nature of the synergistic chemical combinations and what effect they have on generating recommendations for adding sanitizers or other chemicals to the hot tub.

In order to appreciate applicants' system and method for determining the correct amount of a sanitizer, such as chlorine, to add to the water in a hot tub reference should be made to applicants FIG. 5, which shows a flow chart 60 of applicants' method and system for generating recommendations on when to add chlorine based on a step of determining if the water contains a synergistic chemical combination.

More specifically, in applicants' method, which is shown in flow chart 60, one monitors and measures water conditions (61) in the hot tub. In the next step applicants' determine if there is silver present in the water in the hot tub (62).

To determine if silver is present a number of methods and test kits are commercially available for determining the presence of silver, with examples including a Silver Reagent Set sold by Hach Company of Loveland Colorado as well as test strips sold by Grainger Industrial Supply of Indianapolis Indiana that one can immerse in the water to determine if silver is present. Another way of determining if the hot tub water contains silver is to look at the contents of the sanitizer that was initially applied to the water to see if the contents include silver. Any one of the above methods may be used to determine if silver is present in the hot tub water.

If silver is not found in the hot tub water (63) the CPU 18 generates Recommendation A (64), which can include adding additional chlorine to the hot tub water as well as other actions a person should take to bring the hot tub water into a suitable condition. However, if one determines there is silver in the hot tub water (65) then one needs to take the next step (66) to determine if there is also a hydantoin present in the hot tub water since the combination of silver and a hydantoin provide a synergistic combination.

The step of determining of the existence of the synergistic combination has a substantial effect on generating the correct recommendations on the amount of chlorine to add to hot tub water, which may be in form of pods or pouches containing chlorine. That is, the free chlorine in the body of water with the synergistic combination of silver and a hydantoin therein can be maintained at a free chlorine level of 0.5 ppm whereas if there is no synergistic combination the minimum recommend amount of chlorine is 1 ppm. Thus, the applicants' generated recommendations based on the presence of a synergistic combinations is a divergence from the "one size fits all" recommendations, which are touted by various industry groups, of maintaining free chlorine levels at a minimum of 1 ppm. Since applicant's method generates maintenance recommendations based on a free chlorine level as low as 0.5 ppm it reduces the opportunity for adverse chlorine reactions. It should be further pointed out that if it is not recognized the hot tub water contains a synergistic combination one might unwittingly double the level of necessary free chlorine in the water based on organizational touted recommendations thus not only increasing maintenance costs but affecting other recommendations and taking away the benefit of having a sanitizer with a low level of free chlorine.

A number of methods for determining if a hydantoin is present are available including spectroscopic analysis. Other methods include the method described in U.S. Pat. No. 4,882,285. Perhaps the simplest method for the pool owner to determine if a hydantoin is present in hot tub water is to check the contents of the previous sanitizer used to sanitize the hot tub since the contents indicates whether a hydantoin was used in the sanitizer. Other method may include sending a sample of water to a laboratory that determine the contents. If there is no hydantoin present (63) the recommendation A (64) is made available for the hot tub owner to bring the water in a usable condition for hot tub use or alternately it may be for pool use.

FIG. 5 shows that in the event a hydantoin is detected (67) the information is sent to the server, which generates a Recommendation B, that is different from Recommendation A.

Figure 2:
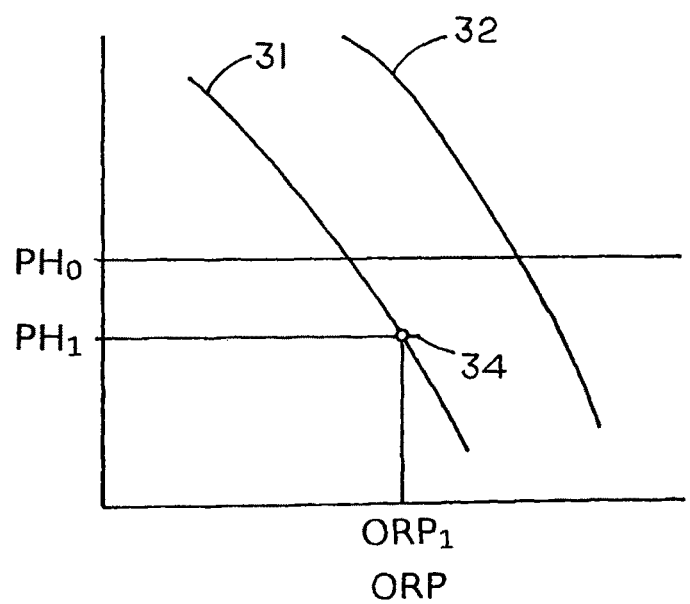
FIG. 2 shows a graph of ORP (Oxidation Reduction Potential) values plotted against pH of the water with free chorine content of the water at different levels of pH identified by a family of curves.

A reference to FIG. 2 shows a graph of a typical family of two free chlorine curves 31 and 32 for interpreting ORP measurements when free chlorine is present in a body of water with pH plotted on the vertical axis and ORP plotted on the horizontal axis. For reference purposes a line $pH_o$ (indicates a neutral pH of 7.0) extends across the midpoint of the graph. In this example the curves, 31 and 32 each identify a different level of free chlorine as a function of an ORP measurement at a given pH. An ORP measurement $ORP_1$ can be associated with either curve 32 (free chlorine level 1.0 ppm) or with curve 31 (free chlorine 0.5 ppm) until the pH of the water is determined. When the pH is determined (in this case $pH_1$) the graph shows the $ORP_1$ intersects with curve 31 at point 34 indicating that the free chlorine level of the system is 0.5 ppm. If the evaluation of the contents of the body is found to obtain a synergistic chemical combination through the evaluation shown in FIG. 5 one determines recommendation B which is associated with curve 31, which corresponds to a level of free chlorine of 0.5 ppm the water. In this case it means that no chlorine would have to be added to the water.

However, If the evaluation is found to not contain a synergistic chemical combination through the evaluation shown in FIG. 5 one generates recommendation A since the ORP measurement 34 indicates the chlorine level is less than 1 ppm (curve 32) and one should add chlorine to the system. The above illustrates an example of how the recommendations change depending on the presence or absence of synergistic chemicals in the water, which may be in a pool, a hot tub or a spa, however, other maintenance instructions of the water may also change based on the presence or absence of a synergistic chemical combination in the water and are within the scope of the invention described herein.

While the invention described herein is directed to maintaining a hot tub body of water the invention may be also used for maintaining other bodies of water in a condition for human immersion such as swimming pools or the like without departing from the spirit and scope of the invention.

We claim:

1. A method for a hot tub operator to maintain a hot tub body of water in a condition for human immersion through addition of chlorine, the method comprising:
   determining whether or not the hot tub body of water contains a silver metal;
   upon determining the hot tub body of water does not contain a silver metal:
      adding a first batch of chlorine to the hot tub body of water to bring the free chlorine content to at least 1 ppm in the hot tub body of water;
   upon determining the hot tub body of water does contain a silver metal:
      further determining the hot tub body of water contains a hydantoin; and
      adding a different batch of chlorine to bring the free chlorine content to at least 0.5 ppm in the hot tub body of water, the different batch of chlorine being less than the first batch of chlorine as the combination of the silver metal, the hydantoin, and the chlorine produce a synergistic chemical combination.

2. The method of claim 1, wherein a buoyant sensor determines the free chlorine content in the hot tub body of water.

3. The method of claim 1, including a buoyant sensor to measure the free chlorine content in the body of water and a server where the buoyant sensor and the server communicate with each other through wireless communication.

4. The method of claim 1, including a smartphone configured to alert a person if the free chlorine content of the body of hot tub water falls below a maintenance level based on the presence or absence of a synergistic chemical combination in the hot tub body of water.

5. The method of claim 1, determining when to add chemicals to a body of water having a sensor located in the body of water with the sensor including transmitting information on at least one measured water parameter to a server located outside the hot tub body of water with the improvement comprising:
   determining if the hot tub body of water contains a silver source metal prior to an identification of an action to add the first batch of chlorine to be taken and identifying a different action to be taken if the hot tub body of water does not contain a silver source.

6. The method of claim 1, including determining if the body of hot tub water contains 1, 3-dichloro-5-5 dimethyl hydantoin prior to adding the different batch of chlorine.

7. The method of claim 1, including determining if the body of hot tub water contains 1, 3-dichloro-5-ethyl-5-methyl hydantoin prior to adding the different batch of chlorine.

8. The method of claim 1, wherein the body of hot tub water is maintained at a temperature of at least 100° F. and a maximum of 104° F.

9. A method for a hot tub operator to maintain a hot tub body of water in a condition for human immersion through addition of chlorine, the method comprising:
   determining if the hot tub body of water contains a silver metal;
   upon determining the hot tub body of water does not contain a silver metal:
      adding a first batch of chlorine to the hot tub body of water to bring the free chlorine content to at least 1 ppm in the hot tub body of water;
   upon determining the hot tub body of water does contain a silver metal:
      further analyzing the hot tub body of water to determine the hot tub body of water contains a hydantoin; and
      adding a different batch of chlorine to bring the free chlorine content to at least 0.5 ppm in the hot tub body of water, the different batch of chlorine being less than the first batch of chlorine as the combination of the silver metal, the hydantoin, and the chlorine produce a synergistic chemical combination.

10. The method of claim 9, wherein analyzing the hot tub body of water to determine if the hot tub body of water contains a hydantoin includes spectroscopic analysis.

11. The method of claim 9, wherein determining when to add chemicals to a body of water having the sensor located in the body of water with the sensor including transmitting information on at least one measured water parameter to a server located outside the hot tub body of water with the improvement comprising:

determining if the hot tub body of water contains a silver source metal prior to an identification of an action to add the first batch of chlorine to be taken and identifying a different action to be taken if the hot tub body of water does not contain a silver source.

12. The method of claim 9, including analyzing the hot tub body of water to determine if the hot tub body of water contains 1, 3-dichloro-5-5 dimethyl hydantoin prior to adding the different batch of chlorine.

13. The method of claim 9, including analyzing the hot tub body of water to determine if the hot tub body of water contains 1, 3-dichloro-5-ethyl-5-methyl hydantoin prior to adding the different batch of chlorine.

\* \* \* \* \*